United States Patent [19]

Timby et al.

[11] 4,238,926
[45] Dec. 16, 1980

[54] LIQUID PROCESSING

[75] Inventors: Ernest A. Timby, Frimley; Rodney H. Walsh, Hindhead, both of England

[73] Assignee: The Secretary of State for Defence in Her Britannic Majesty's Government of the United Kingdom of Great Britain and Northern Ireland, London, England

[21] Appl. No.: 943,090

[22] Filed: Sep. 18, 1978

[30] Foreign Application Priority Data

Sep. 22, 1977 [GB] United Kingdom ............... 39607/77

[51] Int. Cl.³ .......................... F02C 9/04; B64D 37/32
[52] U.S. Cl. ........................... 60/39.46 R; 60/39.46 S; 123/1 A; 244/135 R
[58] Field of Search .................... 60/39.46 R, 39.46 S; 123/138, 1 A, 25 R, 141; 44/52; 415/83, 84, 86, 91

[56] References Cited
U.S. PATENT DOCUMENTS

| 839,967 | 1/1907 | Snee | 415/86 |
| 2,584,805 | 2/1952 | Leftwich | 60/39.46 S |
| 2,652,687 | 9/1953 | Yellott | 60/39.46 S |
| 3,818,876 | 6/1974 | Voogd | 123/25 R |
| 3,925,032 | 12/1975 | Osmond | 44/62 |

OTHER PUBLICATIONS

*The Aircraft Gas Turbine Engine and Its Operation,* Pratt and Whitney Aircraft, Marketing Support, Jun. 1952, reprinted with revisions May 1974, FIG. 3-57.

Primary Examiner—Charles J. Myhre
Assistant Examiner—Carl Stuart Miller
Attorney, Agent, or Firm—Pollock, Vande Sande & Priddy

[57] ABSTRACT

Apparatus for degrading safety fuel of the type containing an antimisting polymer and comprising a cylindrical vaned stator and vaned rotor in radially concentric array, whereby rotation of the rotor will cause safety fuel pumped through the apparatus to be subjected to sufficient shear and local acceleration to be degraded to a state acceptable to engines and their control apparatus.

9 Claims, 3 Drawing Figures

LIQUID PROCESSING

The present invention relates to safety fuel degrading apparatus, that is, apparatus for rendering acceptable to normal liquid fuel supply apparatus and burning elements, especially in aircraft, certain liquid fuels, called safety fuels, which carry an anti-misting additive.

Our prior copending U.S. patent application Ser. No. 924,587 filed July 14, 1978 for Fuel Supply Apparatus describes a device for degrading safety fuels, the device having a stator rotor and plenum chamber combination in axial array, whereby in operation the device will shear fuel pumped therethrough and render it sufficiently fluid to pass through filters and pumps and be atomized at burners.

The present invention is an improvement in or alternative to the apparatus described in said U.S. patent application Ser. No. 924,587.

According to the present invention a device for degrading safety fuels comprises a stator and a rotor in radially co-axial array, the stator surrounding the rotor, the stator and rotor having vanes projecting at least substantially radially, the stator vanes toward the rotor vanes, in an annular chamber, the chamber having an inlet, and an outlet and the rotor being adapted to be driven, the arrangement being such that in use of the device with safety fuel being supplied to the annular chamber via the inlet thereto, the safety fuel will be rendered sufficiently fluid to pass through filters and pumps and be atomized at burners.

Preferably there is either one more or one less vane on the rotor than on the stator.

The vanes, particularly those on the rotor, may have a rough, rugose, furrowed or serrated surface, or may even be perforated. While the blades may be planar or curved along axial planes of the device it is preferred that they project at least approximately radially.

According to features of the invention the radial length of the vanes is less than 20%, preferably less than 10%, of the stator vane pitch circle diameter, and the vane roots are so rounded in the circumferential direction as to minimize the occurrence of pockets of relatively static fluid.

The shearing facility of the device will be enhanced by maximized the edge length of the rotor and stator vanes, compared with their area, while keeping a small and substantially constant clearance between coincident rotor and stator vanes. This may be achieved by serrating the vane edges, or making the rotor vanes trapezoidal, broader at base than tip, and arranging for rotor and stator vanes to interfit when coincident. For ease of manufacture it is however preferred that the length of the device is maximized compared with its diameter and the vane edges are straight.

Thus a typical degrader in accordance with the invention and for use in conjunction with an aircraft engine may be 15–25 cm in overall diameter and 5–30 cm in depth. The vanes may be 0.5–2.5 cm in radial length. The clearance between rotor and stator vanes is preferably between 0.5 mm and 4 mm.

The device may form part of a combined pump and degrader unit. It may be part of a degrader apparatus in which several devices in accordance with the present invention are in a bank on a common shaft, in series radially or, more preferably, axially. Moreover it may form part of a degrader apparatus in which one or more devices in accordance with the present invention are in a bank, on a common shaft, with one or more devices of the type described in said co-pending patent application Ser. No. 924,587.

The device or apparatus may be incorporated into a complete fuel supply apparatus just as described in co-pending patent application Ser. No. 924,587.

A safety fuel degrading device in accordance with the present invention will now be described, by way of example, with reference to the accompanying drawings, of which:

Figure 1:
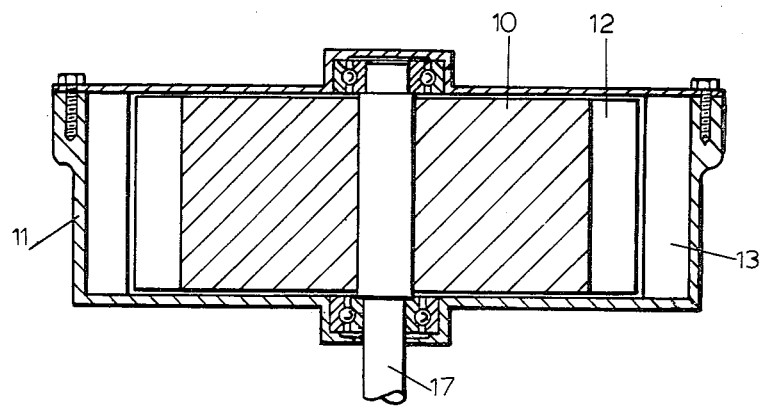
FIG. 1 is a longitudinal section of the device.
Figure 2:
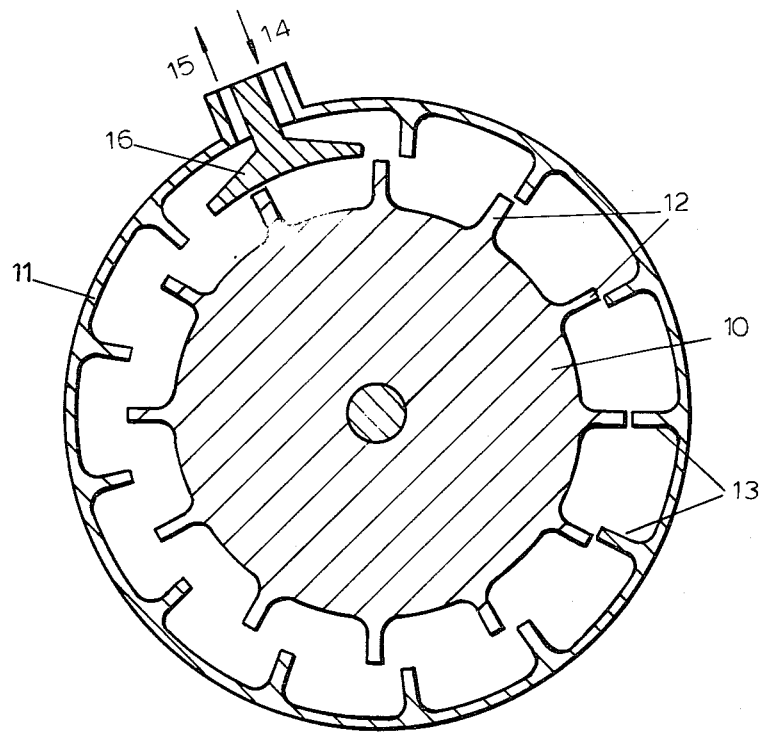
FIG. 2 is a radial section of the device.

The safety fuel degrading device shown in the drawings comprises a rotor 10 and a stator in co-axial array, the stator being formed in a housing 11 surrounding the rotor, and forming with respect thereto an annular chamber.

The rotor 10 has a plurality of vanes 12 which project radially outwards and are in radial length about 10% of the diameter of the device. The root of each vane is faired outwards in concave manner to obviate corners wherein fluid could remain static relating to the vanes.

The stator has a plurality of vanes 13, one more than has the rotor 10. These closely surround the rotor blades 12 and have similar radial depth and root fairing thereto.

The housing has an inlet 14 and an outlet 15, the one separated from the other by a partition 16 of length equal to the rotor vane pitch.

The rotor 10 has a drive shaft 17.

Figure 3:
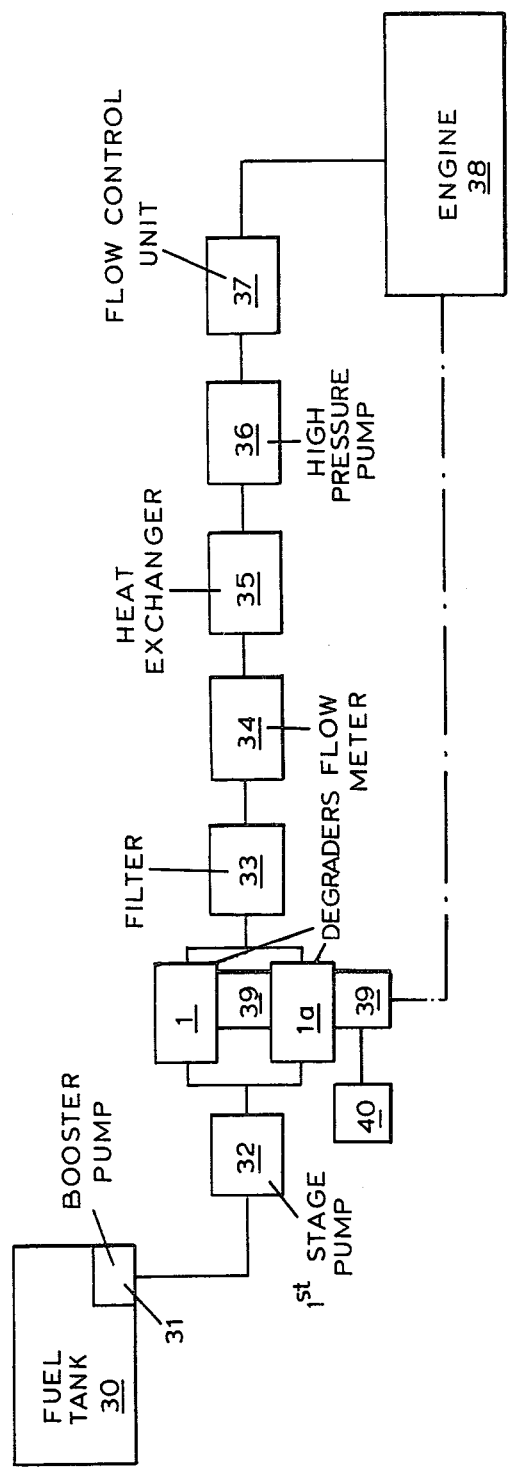
FIG. 3 is a schematic diagram of an aircraft fuel system incorporating the device.

As shown in FIG. 3, two degraders 1, 1a as described above are sited in parallel in an aircraft fuel supply apparatus. This apparatus comprises, connected in line in the order set out, a fuel tank 30, a booster pump 31, a first stage pump 32, the two degraders 1, 1a in parallel, a filter 33, a fluid flow meter 34, a heat exchanger 35, a high pressure pump 36, and a flow control unit 37 which passes the fuel to the burners of an engine 38. The degraders 1, 1a are mounted on the engine 38, to be driven thereby through suitable reduction gearing 39 and a control mechanism 40.

In operation of the fuel supply apparatus during periods of peak demand, eg during take-off of an aircraft, safety fuel in the tank 30, that is, kerosene containing inter alia about 0.3% by weight of a polymer whereby the propensity of the kerosene to mist is severely hampered, is pumped by the booster pump to the degraders 1, 1a the rotors whereof are rotating at about 15,000 rpm.

In the degraders the fuel is subjected to various severe accelerations and shear forces by the vanes 12 and 13 while passing around the annular chamber. It emerges fully fluid at the outlet 15, capable of passing through the filter 33 without clogging the same but leaving thereon any unwanted solids. From the filter it passes through the rest of the supply apparatus to the engine burners.

During cruise conditions the degrader 1a is switched off.

A typical degrader according to the invention has twelve rotor blades 12 and thirteen stator blades 13.

I claim:

1. Aircraft fuel supply apparatus comprising a fuel tank, primary pump means, a main degrader and a relief degrader arranged in parallel, a filter, a flow meter, a heat exchanger, a high pressure pump and a flow control unit, in substantially the order herein listed, each said degrader incorporating:
a cylindrical stator having vanes projecting substantially radially inwardly,
a cylindrical rotor concentrically inside said stator and having vanes projecting radially outwardly, there being thus formed an annular chamber between said rotor and said stator,
an inlet to the chamber, and
an outlet to the chamber at a substantial circumferential distance downstream of said inlet,
said stator vanes and said rotor vanes being bounded by common radial planes
the radial length of said vanes being between 2.5% and 20% of the stator vane pitch circle diameter, and
said rotor being rotatable within said stator to subject fuel in the stator to shear and acceleration forces before it emerges at said outlet,
said apparatus being arranged and operative such that said primary pump means supplies fuel from said fuel tank to at least one of said degraders whence the fuel passes via said filter, said flow meter, said heat exchanger, said high pressure pump and said flow control unit to a fuel burner, and said degraders being operative in consort during periods of relatively high fuel demand and one alone in periods of relatively low fuel demand.

2. Vehicle fuel supply apparatus comprising:
a fuel tank,
pump means,
a filter, and
at least one safety fuel degrader incorporating
a cylindrical stator having vanes projecting substantially radially inwardly,
a cylindrical rotor concentrically inside said stator and having vanes projecting radially outwardly, there being thus formed an annular chamber between said rotor and said stator,
an inlet to the chamber, and
an outlet to the chamber at a substantial circumferential distance downstream of said inlet,
said stator vanes radially surrounding said rotor vanes, the tips of said stator vanes defining a circular locus which is disposed closely adjacent to but radially spaced from a circular locus disposed by the tips of said rotor vanes,
the radial length of said vanes being between 2.5% and 20% of the stator vane pitch circle diameter,
said pump means being arranged and operable to pump fuel from said fuel tank to said degrader and said rotor being rotatable within said stator to subject fuel in the chamber to shear and acceleration forces before it emerges at said outlet, and said outlet being arranged to pass fuel to said filter.

3. A safety fuel degrader comprising:
a cylindrical stator having vanes projecting substantially radially inwardly,
a cylindrical rotor concentrically inside said stator and having vanes projecting radially outwardly, there being thus formed an annular chamber between said rotor and said stator;
an inlet to said chamber and
an outlet from said chamber a substantial circumferential distance downstream of said inlet,
said stator vanes radially surrounding said rotor vanes and there being a numerical difference of one between said rotor vanes and said stator vanes,
each said vane being substantially flat with the plane thereof aligned with the axis of the degrader, each vane having a radial length between 2.5% and 15% of the stator vane pitch circle diameter, and each vane having a fluid pocket obviating root fairing, and there being a clearance between said rotor vanes and said stator vanes of between 0.5 mm and 4 mm,
the degrader being operable upon safety fuel pumped through it, when said rotor is rotated, to subject the fuel to a combination of shear and acceleration forces.

4. A safety fuel degrader comprising:
a cylindrical stator having vanes projecting substantially radially inwardly,
cylindrical rotor concentrically inside said stator and having vanes projecting radially outwardly, there being thus formed an annular chamber between said rotor and said stator,
an inlet to said chamber, and
an outlet to said chamber at a substantial circumferential distance downstream of said inlet,
said stator vanes radially surrounding said rotor vanes,
the radial length of said vanes being between 2.5% and 20% of the stator vane pitch circle diameter, and
said rotor with said rotor vanes being rotatable within said stator and said stator vanes to subject fuel pumped into said inlet to shear and acceleration forces by said vanes before said fuel emerges at said outlet.

5. A degrader as claimed in claim 4 and wherein the number of vanes on said rotor differs from the number of vanes on said stator.

6. A degrader as claimed in claim 5 and wherein the number of vanes on said rotor differs from the number of vanes on said stator by one.

7. A degrader as claimed in claim 4 and wherein the clearance between said rotor and stator vanes is between 0.5 mm and 4 mm.

8. A degrader as claimed in claim 4 and wherein the roots of said vanes have pocket obviating fairings.

9. The degrader of claim 4 including means for driving said rotor at a speed in excess of 5000 revolutions per minute.

* * * * *